United States Patent [19]

Ito

[11] Patent Number: 5,641,149

[45] Date of Patent: *Jun. 24, 1997

[54] GATE VALVE

[75] Inventor: Ichio Ito, Tokyo, Japan

[73] Assignee: Kishikawa Special Valve Co. Ltd., Tokyo, Japan

[*] Notice: The term of this patent shall not extend beyond the expiration date of Pat. No. 5,415,376.

[21] Appl. No.: 427,154

[22] Filed: Apr. 24, 1995

Related U.S. Application Data

[62] Division of Ser. No. 260,703, Jun. 16, 1994, Pat. No. 5,415,376.

[30] Foreign Application Priority Data

Jul. 22, 1993 [JP] Japan ................................. 5-201309
Dec. 16, 1993 [JP] Japan ................................. 5-342760

[51] Int. Cl.⁶ ........................................................ F16K 3/16
[52] U.S. Cl. ................................................ 251/158; 251/187
[58] Field of Search .................................. 251/56, 158, 187, 251/193, 203, 204

[56] References Cited

U.S. PATENT DOCUMENTS 3,120,944  2/1964  Cogeg et al. ........................... 251/158

*Primary Examiner*—John C. Fox
*Attorney, Agent, or Firm*—Nilles & Nilles S.C.

[57] ABSTRACT

A gate valve including a valve disc which is moved to a position where the valve disc is brought into contact with a valve seat and a position where the valve disc is separated from the valve seat by a driving device provided outside of a valve housing through a valve rod sealingly projected from the inside to the outside of the valve housing. The valve disc is brought into contact under pressure with the valve seat in the valve housing when the valve rod is inclined at the end of the movement of the valve rod. The driving device has piston cylinder devices, a block arranged in side-by-side relationship with the piston cylinder devices and connected to the valve rod, and a device to move up and down and to incline the block. The device for moving the block may include a pivotable link or a pin received in an oblique hole in a sleeve.

14 Claims, 6 Drawing Sheets

GATE VALVE

REFERENCE TO A CO-PENDING APPLICATION

This application is a division of Ser. No. 08/260,703, filed Jun. 16, 1994, issued as U.S. Pat. No. 5,415,376 on May 16, 1995.

BACKGROUND OF THE INVENTION

1. Field of the Invention

The present invention relates to a gate valve and more particularly to a gate valve for use in a processing device for processing a semiconductor wafer or the like.

2. Description of the Prior Art

In a processing device for processing a semiconductor wafer, a liquid crystal substrate or the like, the wafer or the substrate is inserted into or taken out from one of many kinds of processing rooms through passages each having a gate valve. It is necessary to prevent as much as possible foreign matters from entering into the processing room.

Such gate valve is described in the Japanese Patent Laid-Open No. 156781/83. In such gate valve, a valve disc is moved up and down while separating from a valve seat, and the valve disc is brought into contact with the valve seat by urging the side surface of the valve disc toward the valve seat when the valve disc is positioned to face to the valve seat.

In said gate valve heretofore in use, however, passage, so that foreign matters are unavoidably produced from said movable parts and entered into the processing room.

SUMMARY OF THE INVENTION

Accordingly, it is an object of this invention to provide a gate valve free from the above defects.

The invention can be summarized as follows.

A gate valve comprising a valve housing, a valve disc disposed in said valve housing so that it is brought into contact with a valve seat provided on said valve housing, a valve rod sealingly projected from the inside of said valve housing to the outside of said valve housing through a bellows, said valve rod being capable of moving up and down and inclining, and a driving means provided at the outside of said valve housing for driving said valve rod to move said valve disc between a position where said valve disc is faced with a gap to said valve seat and a position where said valve disc is not faced to said valve seat, and for inclining said valve rod so that said valve disc is brought into contact under pressure with said valve seat when said valve disc is moved to the position where it is faced to said valve seat, wherein said driving means comprises a piston cylinder means having a piston cylinder, piston and a piston rod, a yoke connected to said piston rod, a block connected to an upper portion of said valve rod, an inclined link with both ends pivotally connected to said yoke and block respectively, a spring for connecting said yoke to said block for suppressing the relative movement in the axial direction of said yoke and block, and a guide formed on a side surface of said piston cylinder for guiding said block so as to move up and down and to incline, and wherein said link becomes flat when said yoke is urged toward said valve rod, so that said valve rod is inclined centering around said block and said disc is brought into contact under pressure with said valve seat.

The invention can also be summarized as follows.

A gate valve comprising a valve housing, a valve disc disposed in said valve housing so that it is brought into contact with a valve seat provided on said valve housing, a valve rod sealingly projected from the inside of said valve housing through a bellows, said valve rod being capable of moving up and down and inclining, and a driving means provided at the outside of said valve housing for driving said valve rod to move said valve disc between a position where said valve disc is faced with a gap to said valve seat and a position where said valve disc is not faced to said valve seat, and for inclining said valve rod so that said valve disc is brought into contact under pressure with said valve seat when said valve disc is moved to the position where it is faced to said valve seat, wherein said driving means comprises a piston cylinder means having a piston cylinder, piston and a piston rod, a yoke connected to said piston rod, a block connected to an upper portion of said valve rod, a pin formed on said block and a sleeve having an elongated oblique hole formed on said yoke, said pin being passed through said hole to connect said yoke with said block, a spring for connecting said yoke to said block for suppressing the relative movement in the axial direction of said yoke and block, and a guide formed on a side surface of said piston cylinder for guiding said block so as to move up and down and to incline, and wherein when said yoke is urged toward said valve rod, said valve rod is inclined centering around said block and said disc is brought into contact under pressure with said valve seat.

Other objects and advantages will become apparent from the following description of the preferred embodiments taken in conjunction with the accompanying drawings.

DESCRIPTION OF THE PREFERRED EMBODIMENTS

Figure 1:
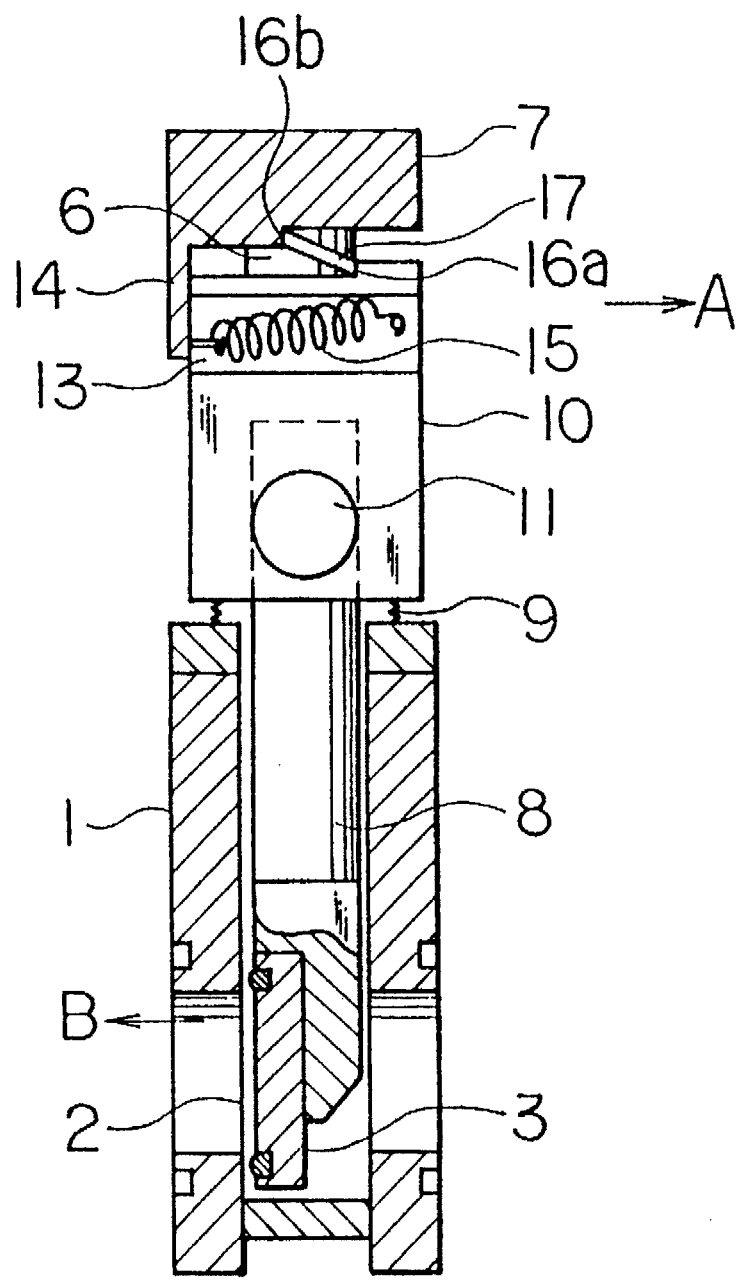
FIG. 1 is a vertically sectioned side view of a gate valve in a state just before the gate valve is closed.
Figure 2:
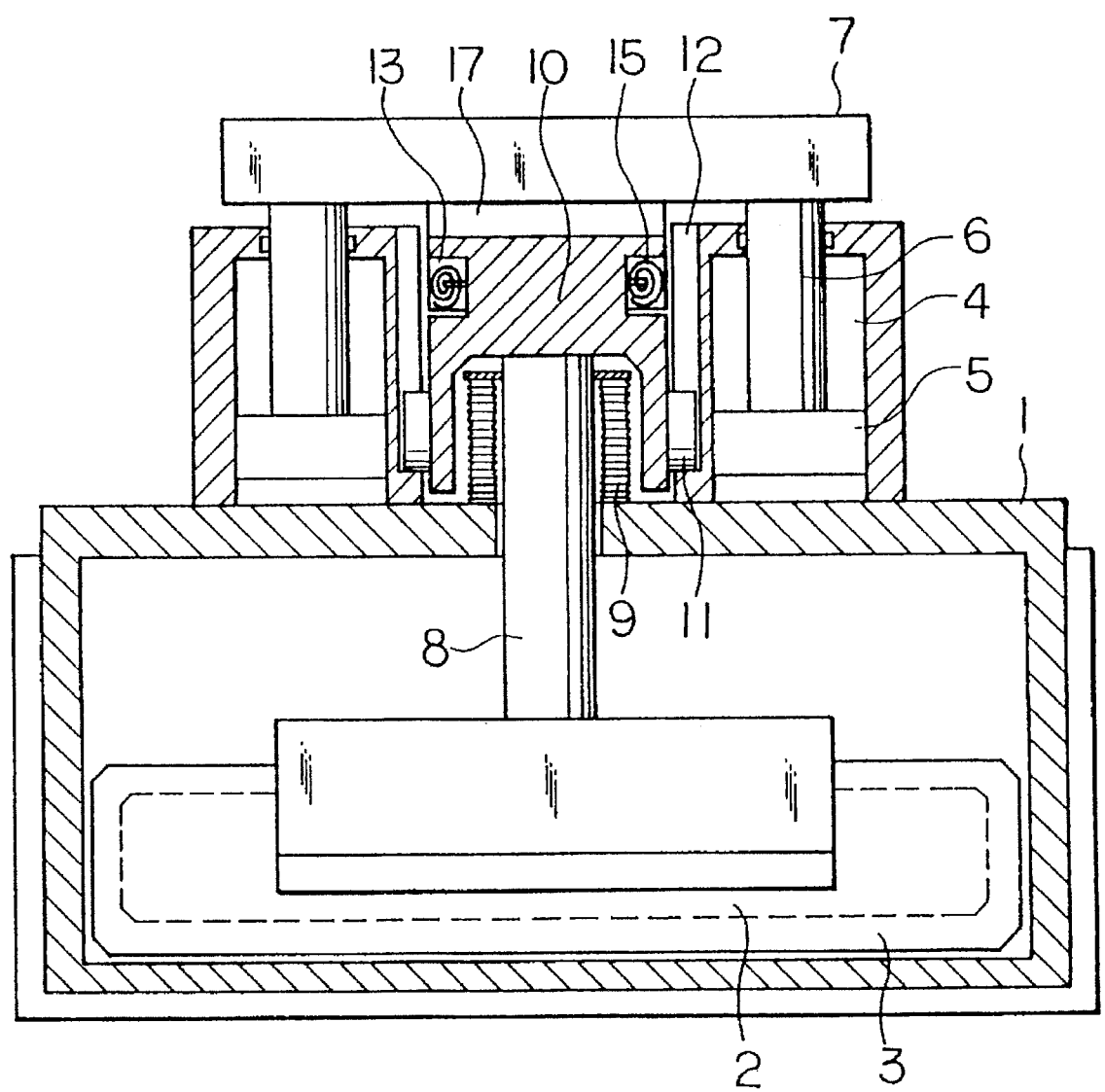
FIG. 2 is a vertically sectioned front view of the gate valve of FIG. 1 in a state just before the gate valve is closed.

In FIGS. 1 to 5, a gate valve is illustrated which is disclosed and claimed in co-pending and commonly assigned application Ser. No. 260,703, filed Jun. 16, 1994. Reference numeral 1 denotes a hollow box-like valve housing, 2 denotes a valve seat formed around a rectangular opening of said valve housing 1, 3 denotes a rectangular plate-like valve disc arranged in said valve housing 1 so as to face to said valve seat 2, 4 denotes piston cylinder provided at both upper sides of said valve housing 1, 5 denotes a piston of said piston cylinder 4, 6 denotes a piston rod thereof, 7 denotes a yoke connected to both upper ends of said piston rods 6, and 8 denotes a valve rod connected to said valve disc 3 and projected from the inside of said valve housing 1 to the outside of said valve housing 1.

In the present invention, one end of a cylindrical extension bellows 9 is sealingly secured to a portion of said valve rod 8 projected to the outside of said valve housing 1, the other end of said bellows 9 is sealingly secured to said valve housing 1.

Further, a block 10 is connected to an upper portion of said valve rod 8. Pivotal shafts 11 are provided at both sides of said block 10 so as to project in a direction normal to a moving direction of said valve disc 3 in the horizontal plane. Vertical guide grooves 12 of a predetermined length are formed at inner side surfaces of cylinders of said piston cylinder means 4 for guiding said pivotal shafts 11, so that said valve rod 8 can be inclined centering around said pivotal shafts 11 when said pivotal shafts 11 are supported by the lower ends of said grooves 12 and said block 10 is pushed in the direction of an arrow A in FIG. 1. According to the inclination of said valve rod 8, said valve disc 3 connected to the lower end of said valve rod 8 moves in the direction of an arrow B in FIG. 1 and is brought into contact under pressure with said valve seat 2.

Further, grooves 13 are formed at said side surfaces of said block 10, and tension springs 15 are arranged in said grooves 13, respectively. A downward plate 14 is provided on a side surface of said yoke 7 at the side of said valve seat 2, and one end of said tension spring 15 is secured to said downward plate 14 and the other end of said tension spring 15 is secured to said block 10.

Further, step portions 16a and 16b facing to each other are formed on an upper surface of said block 10 and a lower surface of said yoke 7, respectively. A planar plate cam 17 of a diamond shape in cross section is disposed obliquely between said step portions 16a and 16b, so that said block 10 is lowered when said yoke 7 is moved down by the piston rod 6 of said piston cylinder means 4. If said yoke 7 is pushed down toward said block 10 in a state that said pivotal shaft 11 of the block 10 is brought into contact with the lower end of said guide grooves 12 formed on the side surface of the cylinder of said piston cylinder means 4, said inclined planar plate cam 17 becomes flat substantially, and the upper portion of said block 10 is moved in the direction of the arrow A against the spring force of the tension spring 15, so that the valve disc 3 is moved in the direction of the arrow B and brought into contact under pressure with the valve seat 2.

It is preferable that said planar plate cam 17 and said tension spring 15 are arranged usually in directions different from each other as shown in FIG. 1.

According to the gate valve mentioned above, when the yoke & is lowered by the action of said piston cylinder 4 to close the valve, the block 10 is also lowered, because the block 10 is brought into frictional engagement with the downward plate 14 of the yoke 7 by the spring force of the tension spring 15, so that the valve disc 3 is lowered to a position where the valve disc 3 faces the valve seat 2. At this position, the pivotal shafts 11 are brought into contact with the lower ends of said guide grooves 12.

In this state, the downward movement of the block 10 is stopped, but the yoke 7 is lowered further toward the block 10, so that the inclined planar plate cam 17 becomes substantially flat (horizontal) and thus the upper portion of the block 10 moves horizontally as shown by the arrow A in FIG. 1 against the spring force of the tension spring 15. According to the horizontal movement of the upper portion of the block 10, the block 10 is inclined around the pivotal shafts 11 against the spring force of the tension spring 15, so that the valve disc 3 connected to the lower end of the valve rod 8 is moved in the direction of the arrow B and brought into contact under pressure with the valve seat 2.

After the downward movement of the yoke 7 due to the piston cylinder 4 is stopped, the valve disc 3 is maintained in the contact state under pressure with the valve seat 2.

Figure 3:
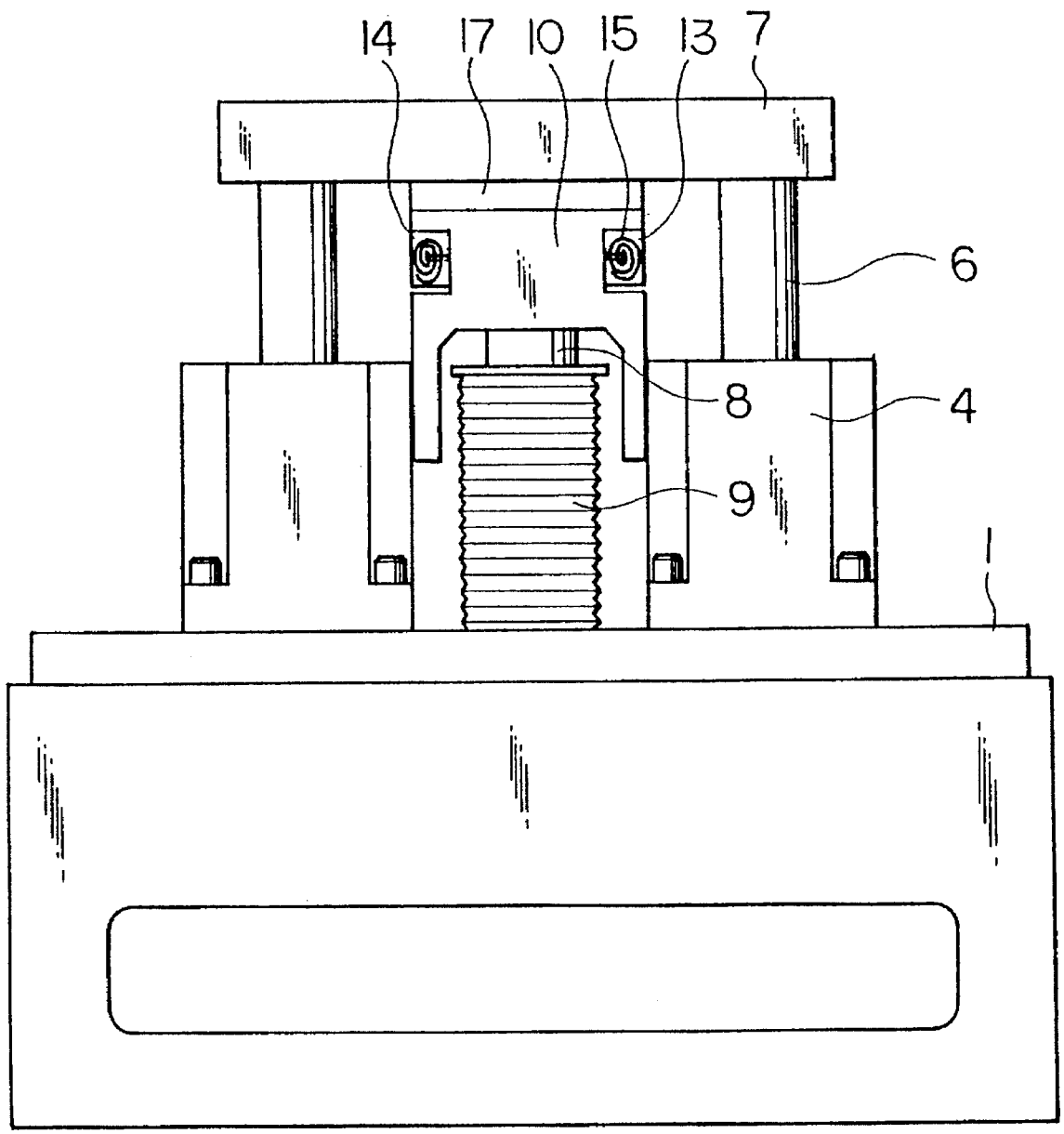
FIG. 3 is a front view of the gate valve of FIGS. 1 and 2 in an open state.
Figure 4:
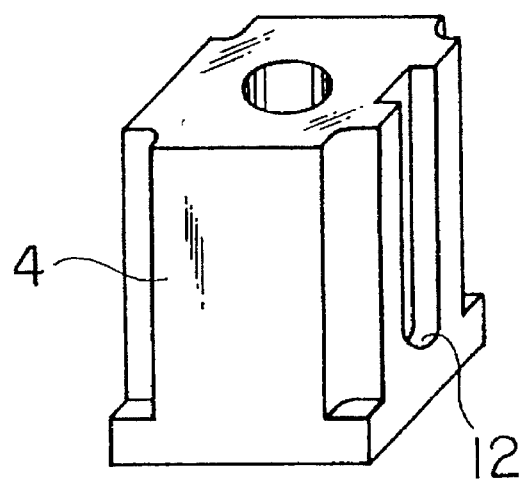
FIG. 4 is a perspective view of a piston cylinder of the gate valve of FIGS. 1–3.
Figure 5:
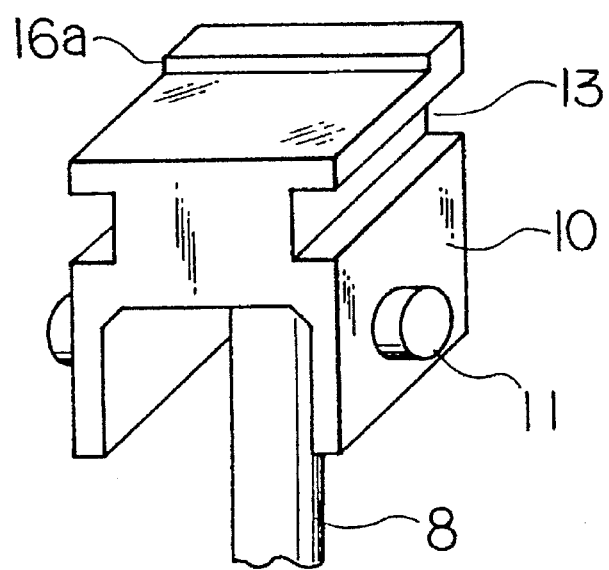
FIG. 5 is a perspective view of a block portion of the gate valve of FIGS. 1–4.

When the piston cylinder 4 is operated to open the valve, only the yoke 7 is moved up at first relative to the block 10, because the downward plate 14 of the yoke 7 is separated from the side surface of said block 10, while the frictional force is exerted between the valve seat 2 and the valve disc 3. Accordingly, the planar plate cam 17 is inclined again by the spring action of the tension spring 15 and at the same time the inclined valve rod 8 is restored in an upright position to move the valve disc 3 in a direction opposite to the direction of arrow B and separate from the valve seat 2, and then the block 10 is moved up together with the yoke 7 to open the valve as shown in FIG. 3.

The cylindrical bellows 9 is inclined and deformed when said valve rod 8 is inclined. Accordingly, it is preferable that the stop position of said pivotal shaft 11 is determined on a level with the substantial middle portion of the cylindrical bellows 9, because the inclination and the deformation of the cylindrical bellows 9 become minimum.

Figure 6:
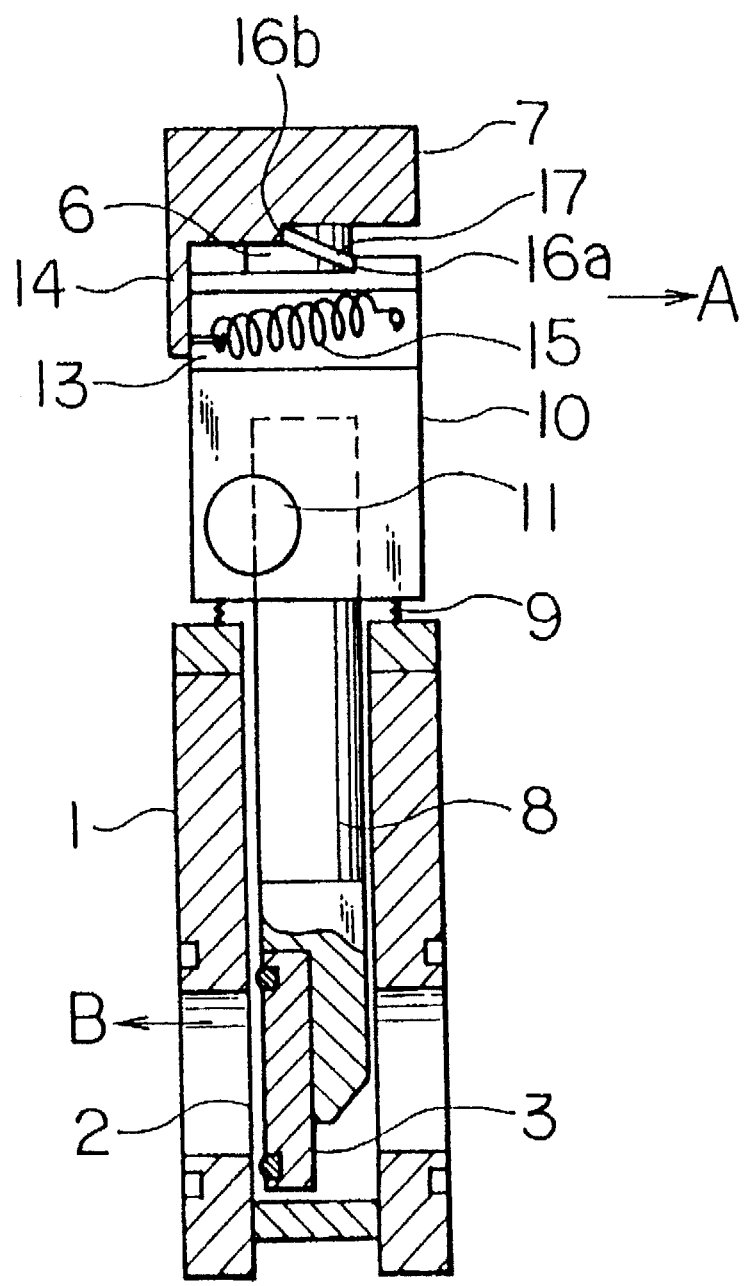
FIG. 6 is a vertically sectioned side view of a gate valve of a first preferred embodiment of the present invention.

FIG. 6 shows another embodiment, wherein said guide grooves 12 and the pivotal shafts 11 are located on or near a line passing through the surface of the valve seat 2 facing the valve disc 3.

According to this embodiment, the valve disc 3 moves in a direction normal substantially to the surface of the valve seat 2 and is brought into contact with the valve seat 2, so that the unbalance contact of the valve seat 2 can be avoided.

Figure 7:
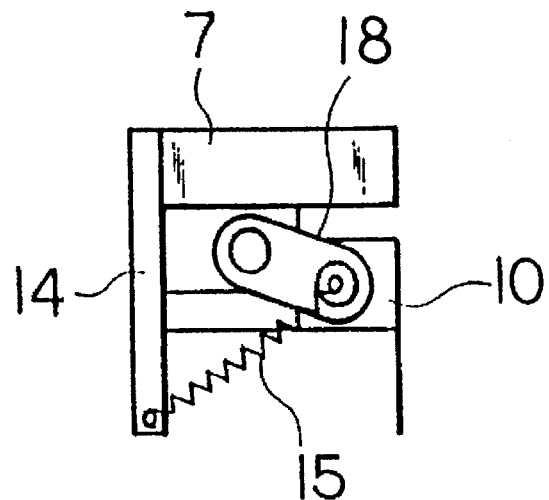
FIG. 7 is a side view of a portion of the gate valve of a further preferred embodiment of the present invention.

FIG. 7 shows a first preferred embodiment of the present invention, wherein an inclined link 18 is used instead of providing said step portions 16a and 16b and said planar plate cam 17. One end of said link 18 is connected rotatably to the lower portion of the yoke 7 and the other end of said link 18 is connected rotatably to the upper portion of the block 10. As in the first embodiment, the block 10 is urged to the left by a spring 15. The link 18 is inclined with respect to the horizontal when the yoke 7 is displaced from the block 10 and valve rod 8 (FIG. 1), and lies flat or horizontal when the yoke 7 is urged towards the block 10 and valve rod 8. Thus, when the yoke 10 is lowered, the valve rod 8 pivots about the block 10 and the disc 3 is brought into contact with the valve seat 2 under pressure.

The gate valve of this embodiment otherwise may be constructed and may operate the same as the gate valves mentioned in the preceding embodiments, and accordingly, the detailed explanation thereof is omitted.

Figure 8:
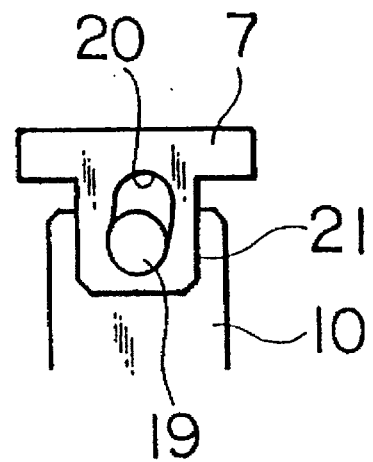
FIG. 8 is a front view of a portion of the gate valve of yet a further embodiment of the present invention.

FIG. 8 shows another preferred embodiment of the present invention, wherein a pin 19 is provided on the upper portion of the block 10 so as to project normally to the axial direction of the pivotal shaft 11, and a sleeve 21 extending downwards from the lower end of the yoke 7 is used instead of providing said step portions 16a and 16b and said planar plate cam 17 or the link 18. Said sleeve 21 has an oblique elongated hole 20 into which the pin 19 is inserted.

In this embodiment, the upper portion of the block 10 is moved horizontally when the yoke 7 is moved down toward the block 10, as in the preceding embodiments.

EFFECT OF THE INVENTION

This invention provides important advantages over conventional gate valves. For example, the gate valve of the present invention has no mechanical parts for urging the valve disc 3 toward the valve seat 2 in the valve housing 1 which is hermetically sealed to the outside by the bellows 9, so that foreign matter which would probably be produced due to the frictional movements of the mechanical parts or the like can be prevented from being produced, on the contrary to the conventional gate valve. Further, the driving means for driving the valve disc can be of simple construction. Furthermore, the gate valve of the present invention can be made small in height and size, if the block 10 is disposed between two piston cylinders 4.

What is claimed is:

1. A gate valve comprising: a valve housing, a valve disc disposed in said valve housing so that it is selectively brought into contact with a valve seat provided on said valve housing, a valve rod sealingly projected from the inside of said valve housing to the outside of said valve housing through a bellows, said valve rod being capable of moving up and down and inclining, and a driving means provided at the outside of said valve housing for (1) driving said valve rod to move said valve disc between a position where said valve disc is faced with a gap to said valve seat and a position where said valve disc is not faced to said valve seat, and for (2) inclining said valve rod so that said valve disc is brought into contact under pressure with said valve seat when said valve disc is moved to the position where it is faced to said valve seat, wherein said driving means comprises a piston cylinder means having a piston cylinder and a piston rod, a yoke connected to said piston rod, a block connected to an upper portion of said valve rod, an inclined link with both ends pivotally connected to said yoke and block, respectively, a spring for connecting said yoke to said block for suppressing the relative movement in the axial direction of said yoke and block, and a guide formed on a side surface of said piston cylinder for guiding said block so as to move up and down and to incline, and wherein said link becomes flat when said yoke is urged toward said valve rod, so that said valve rod is inclined around said block and said disc is brought into contact under pressure with said valve seat.

2. A gate valve as claimed in claim 1, wherein said block has a pivotal shaft which is guided by said guide, and wherein said pivotal shaft and said guide are located on or near a line passing through the surface of the valve seat facing the valve disc.

3. A gate valve comprising: a valve housing, a valve disc disposed in said valve housing so that it is selectively brought into contact with a valve seat provided on said valve housing, a valve rod sealingly projected from the inside of said valve housing to the outside of said valve housing through a bellows, said valve rod being capable of moving up and down and inclining, and a driving means provided at the outside of said valve housing for (1) driving said valve rod to move said valve disc between a position where said valve disc is faced with a gap to said valve seat and a position where said valve disc is not faced to said valve seat, and for (2) inclining said valve rod so that said valve disc is brought into contact under pressure with said valve seat when said valve disc is moved to the position where it is faced to said valve seat, wherein said driving means comprises a piston cylinder means having a piston cylinder and a piston rod, a yoke connected to said piston rod, a block connected to an upper portion of said valve rod, a pin formed on said block and a sleeve having an elongated oblique hole formed on said yoke, said pin being passed through said hole to connect said yoke with said block, a spring for connecting said yoke to said block for suppressing the relative movement in the axial direction of said yoke and block, and a guide formed on a side surface of said piston cylinder for guiding said block so as to move up and down and to incline, and wherein when said yoke is urged toward said valve rod, said valve rod is inclined around said block and said disc is brought into contact under pressure with said valve seat.

4. A gate valve as claimed in claim 3, wherein said block has a pivotal shaft which is guided by said guide, and wherein said pivotal shaft and said guide are located on or near a line passing through the surface of the valve seat facing the valve disc.

5. A gate valve comprising:
   (A) a valve housing having a valve seat provided thereon;
   (B) a valve disc disposed in said valve housing and capable of contacting said valve seat;
   (C) a valve rod connected to said valve disc, projecting outside of said valve housing, and being capable of moving vertically and pivoting with respect to said valve housing; and
   (D) drive means, located outside of said housing, for driving said valve rod to (1) move said valve disc vertically from a position in which said valve disc does not face said valve seat to a position in which said valve disc faces said valve seat with a gap formed therebetween, and then to (2) pivot said valve disc into contact with said valve seat, wherein said drive means comprises
      1. a piston cylinder including a piston and a piston rod,
      2. a yoke connected to the piston rod,
      3. a block connected to an upper portion of said valve rod,
      4. a link having opposed ends pivotally connected to said yoke and to said block, respectively,
      5. a spring which is connected to said yoke and to said block and which suppresses relative movement of said yoke and said block, and
      6. a guide which is formed on a side surface of said piston cylinder and which guides said block to move vertically and to pivot.

6. A gate valve as defined in claim 5, wherein said link is inclined with respect to the horizontal when said yoke is displaced from said block and becomes horizontal when said yoke is urged toward said block, so that said valve rod pivots about said block and said valve disc is brought into contact with said valve seat under pressure.

7. A gate valve as defined in claim 6, further comprising a pivotable shaft which extends through said block and which is guided by said guide, and wherein said pivotable shaft and said guide are located one of (1) on and (2) adjacent a line passing through the surface of the valve seat facing the valve disc.

8. A gate valve as defined in claim 5, further comprising a pivotable shaft which extends through said block and which is guided by said guide, and wherein said pivotable shaft and said guide are located one of (1) on and (2) adjacent a line passing through the surface of the valve seat facing the valve disc.

9. A gate valve as defined in claim 5, wherein said guide comprises a vertical groove formed in a side of said piston facing said block, and further comprising a pivotable shaft which extends horizontally from said block at a location vertically between said link and said valve disc and which is received in said groove.

10. A gate valve comprising:
    (A) a valve housing having a valve seat provided thereon;
    (B) a valve disc disposed in said valve housing and capable of contacting said valve seat;

(C) a valve rod connected to said valve disc, projecting outside of said valve housing, and being capable of moving vertically and pivoting with respect to said valve housing;

(D) drive means, located outside of said housing, for driving said valve rod to (1) move said valve disc vertically from a position in which said valve disc does not face said valve seat to a position in which said valve disc faces said valve seat with a gap formed therebetween, and then to (2) pivot said valve disc into contact with said valve seat, wherein said drive means comprises
1. a piston cylinder including a piston and a piston rod,
2. a yoke connected to the piston rod,
3. a block connected to an upper portion of said valve rod,
4. a pin located on said block,
5. a sleeve located on said yoke and having an elongated oblique hole formed therein, said pin passing through said hole to connect said yoke to said block, and
6. a guide which is formed on a side surface of said piston cylinder and which guides said block to move vertically and to pivot.

11. A gate valve as defined in claim 10, wherein, when said yoke is urged towards said block, said valve rod pivots about said block and said disc is brought into contact with said valve seat under pressure.

12. A gate valve as defined in claim 11, further comprising a pivotable shaft which extends through said block and which is guided by said guide, and wherein said pivotable shaft and said guide are located one of (1) on and (2) adjacent a line passing through the surface of the valve seat facing the valve disc.

13. A gate valve as defined in claim 10, further comprising a pivotable shaft which extends through said block and which is guided by said guide, and wherein said pivotal shaft and said guide are located one of (1) on and (2) adjacent a line passing through the surface of the valve seat facing the valve disc.

14. A gate valve as defined in claim 10, wherein said guide comprises a vertical groove formed in a side of said piston cylinder facing said block, and further comprising a pivotable shaft which extends horizontally from said block at a location vertically between said pin and said valve disc and which is received in said groove.

* * * * *